United States Patent
Nordbruch et al.

(10) Patent No.: US 9,816,283 B2
(45) Date of Patent: Nov. 14, 2017

(54) METHOD FOR OPERATING A TOWING ROBOT

(71) Applicant: Robert Bosch GmbH, Stuttgart (DE)

(72) Inventors: Stefan Nordbruch, Kornwestheim (DE); Rolf Nicodemus, Bietigheim-Bissingen (DE); Albrecht Irion, Stuttgart (DE); Stefan Hoffmann, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 14/924,315

(22) Filed: Oct. 27, 2015

(65) Prior Publication Data
US 2016/0115702 A1    Apr. 28, 2016

(30) Foreign Application Priority Data
Oct. 27, 2014  (DE) .......... 10 2014 221 770

(51) Int. Cl.
| | |
|---|---|
| *E04H 6/24* | (2006.01) |
| *G05D 1/00* | (2006.01) |
| *G05D 1/02* | (2006.01) |
| *G08G 1/09* | (2006.01) |
| *B60W 30/06* | (2006.01) |
| *G08G 1/0968* | (2006.01) |

(52) U.S. Cl.
CPC ............. *E04H 6/24* (2013.01); *G05D 1/0055* (2013.01); *G05D 1/02* (2013.01); *B60W 30/06* (2013.01); *G05D 2201/0216* (2013.01); *G08G 1/0968* (2013.01)

(58) Field of Classification Search
CPC ........ G05D 1/02; G08G 1/0968; B60W 30/06
See application file for complete search history.

(56) References Cited

U.S. PATENT DOCUMENTS

| | | | |
|---|---|---|---|
| 8,016,303 B1* | 9/2011 | Ullman | B62B 5/0083 280/79.4 |
| 2015/0239436 A1* | 8/2015 | Kanai | B60T 7/08 701/23 |
| 2015/0286219 A1* | 10/2015 | Reichel | G08G 1/0965 701/23 |

FOREIGN PATENT DOCUMENTS

DE    102012021282 A    4/2014

OTHER PUBLICATIONS

Yonezawa et al., "A Car Transportation System Grasping Two Drive Wheels", 2012 IEEE International Conference on Robotics and Automation, RiverCentre, Saint Paul, Minnesota, USA, May 2012, pp. 4086-4091.

(Continued)

*Primary Examiner* — Thomas Ingram
(74) *Attorney, Agent, or Firm* — Norton Rose Fulbright US LLP; Gerard Messina

(57) ABSTRACT

A method is provided for operating a towing robot, where in the event an error occurs during autonomous driving of a vehicle within a parking lot, the error causing the vehicle to be no longer able to continue its autonomous driving, the towing robot is instructed to tow the vehicle to a predetermined position, so that the towing robot tows the vehicle to the predetermined position in response to the instruction. Also described herein are a towing robot, a parking system, as well as a computer program.

10 Claims, 1 Drawing Sheet

(56) References Cited

OTHER PUBLICATIONS

Vision Systems, "Vision-Guided Robotics: 3-D vision optimizes robotic car parking", Jan. 1, 2013, http://www.vision-systems.com/articles/print/volume-18issue-01/departments/technology-trends/vision-guided-roboticx.html, 4 pages.
Endo et al., "A Car Transportation System by Multiple Mobile Robots -iCART-", 2008 IEEE/RSJ International Conference on Intelligent Robots and Systems, Acropolis Convention Center, Nice, France, Sep. 2008, pp. 2795-2801.
DigInfo TV, "Honda Automatic Driverless Valet Parking System", Oct. 21, 2013, http://www.diginfo.tv/v/13/0081-r-en.php, 5 pages.

* cited by examiner

METHOD FOR OPERATING A TOWING ROBOT

FIELD OF THE INVENTION

The present invention relates to a method for operating a towing robot. The present invention further relates to a towing robot, a parking system and a computer program.

BACKGROUND INFORMATION

In the case of highly/fully automated (autonomous) so-called valet parking, the vehicle is parked by its driver at a delivery point, for example in front of a parking garage, and from there the vehicle drives independently into a parking position/parking bay and back again to the delivery point.

In this scenario, an occurring error may be problematic, i.e., when the vehicle stops on the way and the parking garage/the parking lot is blocked as a result.

Furthermore, robot systems are known which drive the vehicle from the delivery point to the parking position and back.

SUMMARY

An object underlying the present invention may be seen in providing a method for operating a towing robot, which makes it possible that a parking garage or a parking lot is not blocked by the vehicle in the event of an error of an autonomously driving vehicle.

The object underlying the present invention may further be seen in providing a related towing robot.

Furthermore, the object underlying the present invention may be seen in providing a related parking system.

The object underlying the present invention may also be seen in providing a related computer program.

According to one aspect, a method for operating a towing robot is provided, where in the case an error occurs during autonomous driving of a vehicle within a parking lot, the error causing the vehicle to be no longer able to continue its autonomous driving (for example, the error causes the vehicle to be immobilized), the towing robot is instructed to tow the (for example, immobilized) vehicle to a predetermined position, so that the towing robot tows the (for example, immobilized) vehicle to the predetermined position in response to the instruction.

According to yet another aspect, a towing robot is provided, which is configured for towing a vehicle present within a parking lot (for example, an immobilized) vehicle, which due to an occurring error is no longer able to continue its autonomous driving, to a predetermined position in response to an instruction.

According to yet another aspect, a parking system is provided, including a parking lot and the towing robot according to the present invention.

According to yet another aspect, a computer program is provided, which includes program code for carrying out the method according to the present invention, when the computer program is executed on a computer.

The present invention thus includes in particular the idea of towing the vehicle away or clearing it out of the way by a towing robot, in the event of an error of an automated valet parking operation in which the vehicle drives itself from the delivery point to the parking position or returns from it. This is due to the vehicle being no longer able to resume or continue its autonomous driving. This means that the vehicle is no longer able to carry out its autonomous driving task.

Preferably, the vehicle detects this itself. The case that the vehicle is no longer able to continue its autonomous driving includes in particular the case that the vehicle is immobilized. If in light of the description, statements are made in connection with an immobilized vehicle, the general case should always be included in reading this that the vehicle is no longer able to continue its autonomous driving due to the occurring error. The "immobilization" is consequently to be seen as an example and as a placeholder for the general case.

The towing in the event of an error advantageously effectuates that an immobilized vehicle (generally, a vehicle which is no longer able to carry out its autonomous driving task, i.e., a vehicle which is no longer able to continue its autonomous driving) no longer represents an obstruction for other vehicles or persons. Other vehicles are thus able to drive within the parking lot unimpeded. This thus means in an advantageous manner that the parking lot may remain in operation even in the event of an error.

A parking lot within the meaning of the present invention may also be referred to as a parking place and is used as a parking area for vehicles. The parking lot thus forms in particular a coherent area which has multiple parking spaces (in the case of a parking lot on private land) or parking zones (in the case of a parking lot on public land). The parking lot may be included in a parking garage according to one specific embodiment. In particular, the parking lot includes a garage.

According to one specific embodiment, autonomous driving of a vehicle within the parking lot is an instance of autonomous driving of the vehicle from a delivery point, at which a driver of the vehicle may drop off his vehicle, to a parking space, i.e., to a parking position, or vice versa. This thus means in particular that the autonomous driving of the vehicle may include automatic maneuvering into or out of a parking space.

An error within the meaning of the present invention is, for example, a defect in the drive engine of the vehicle, i.e., the drive engine no longer functions. An error is, for example, a defect in a brake of the vehicle. This means that the brake of the vehicle no longer works or no longer functions properly. An error is, for example, an obstruction for the vehicle, which the vehicle is not able to drive around autonomously.

Furthermore, an error may include the presence of a situation, in which the vehicle no longer knows what it should do. For example, an autonomously driven vehicle and a "manual vehicle" (a vehicle which is not autonomous, but is instead guided with the aid of a driver) meet one another and it is not possible to clarify the right of way. Humans agree on who is to drive first, for example, via hand signals. This is generally not possible between an autonomously driving vehicle and a manual one.

An error includes, for example, the case that the vehicle no longer has sufficient information (for example, a digital map) in order to carry out the driving task, or the vehicle determines that the information has an error or an apparent error.

Towing within the meaning of the present invention includes in particular transporting the vehicle away from the position in which the vehicle was immobilized to the predetermined position with the aid of the towing robot. This predetermined position may be denoted in particular as an error area. It is an error area since a vehicle is only parked there with the aid of the towing robot in the event of an error.

According to one specific embodiment, it is provided that the towing robot is designed as a parking robot. Such a parking robot is configured in particular for transporting a vehicle autonomously to a parking position, i.e., to a parking area, and parking it there, and bringing it back or transporting it again from this parking position to a pickup position, from which a driver of the vehicle may again pick up his/her vehicle. The towing robot thus assumes a dual function: towing and automatically maneuvering vehicles into or out of a parking space. Consequently, such a towing robot may be put to particularly efficient use, since when no error occurs, it may be used to maneuver vehicles, which could not carry this out independently, into or out of parking spaces autonomously. This means in particular that the capacity of such a towing robot may be better utilized.

In another specific embodiment, it is provided that the autonomous driving of the vehicle is monitored for errors using a monitoring system external to the vehicle. This produces in particular the technical advantage that, for example, a parking lot management system is able to observe whether an error occurs during the autonomous driving of the vehicle. The parking lot management system is thus able to take appropriate action.

The monitoring system external to the vehicle includes, for example, one or multiple video cameras. This thus means in particular that the parking system may have one or multiple video cameras for monitoring the autonomous driving. Thus, for example, a parking garage is provided with one or multiple monitoring or video cameras for monitoring the autonomous driving of the vehicle.

According to another specific embodiment, it is provided that the towing robot is instructed to tow in response to an error message of the vehicle. This thus means in particular that in this case the vehicle itself has detected an error and reports it, in particular the vehicle reports its error to a parking lot management system. In response to this error message, the towing robot is then instructed to carry out the towing.

According to another specific embodiment, it is provided that an area, in which the towing robot moves in order to tow away the vehicle, is blocked for other vehicles and/or for persons, at least during a towing time. This produces in particular the technical advantage that safety is increased for other vehicles and for persons if they stay outside of the area in which the towing robot moves during the towing.

Exemplary blocking measures thus include, for example, the use of an infrastructure (traffic signals, barriers, etc.) to prohibit or prevent the entry of manual vehicles into this area in which the towing robot moves. This means that light signal sources (traffic signals, singular to be included)) and/or barriers are controlled in such a way that the traffic signals emit a red signal light for blocking and/or the barriers (singular to be included) are closed for blocking. Furthermore, it is preferably provided that autonomous vehicles receive a message from the coordinating parking lot management system (for example, via WLAN) that their driving is redirected, or that they should stop.

According to another specific embodiment, it is provided that at least one of the following activities is documented: autonomous driving of the vehicle within the parking lot and towing of the vehicle with the aid of the towing robot. This produces in particular the technical advantage that it is possible to analyze the individual activities once more, even at a later point in time, i.e., in particular after the towing. This is advantageous in particular to be able to plan possible optimizations in a towing operation. The documenting includes, for example, the preparation of video recordings. This thus means in particular that the activities described above are recorded with the aid of one or multiple video cameras. Another advantage of documenting the operations is in particular that it may be easier to verify whether (or not) damage, for example, damage to the vehicle, for example, during the towing, has occurred during the operation. This is in particular practical and advantageous if the operations which relate to the towing robot, thus in particular the towing, are documented.

In another specific embodiment, it is provided that all activities, in particular the autonomous driving of the vehicle within the parking lot and/or the towing of the vehicle with the aid of the towing robot and/or the driving of the towing robot are documented by the parking lot management system, for example, by the preparation of video recordings.

A parking lot management system coordinates in particular an assignment of the parking spaces or parking zones, i.e., the parking positions, and/or hands over to the autonomous vehicles the information necessary for the autonomous driving (for example, a digital map of the parking lot, in particular of the parking garage). The parking lot management system may preferably include a data processing device, which carries out or supports the above-described tasks of the parking lot management system.

In another specific embodiment, it is provided that the parking system includes a monitoring system external to the vehicle for monitoring an instance of autonomous driving of a vehicle within the parking lot for errors. Such a monitoring system includes, for example, one or multiple video cameras, which may also be denoted in particular as monitoring cameras.

According to one specific embodiment, a documentation device is provided for documenting at least one of the following activities: autonomous driving of the vehicle within the parking lot and towing of the vehicle with the aid of the towing robot.

DETAILED DESCRIPTION

At this point, it is noted that the drawings in the figures are only schematic block diagrams and are therefore not real depictions of a towing robot or of a parking system.

It is noted once more that the formulations "immobilized" or "immobilized vehicle" are provided as an example and a placeholder for the general case that the vehicle can no longer carry out its autonomous driving.

Figure 1:
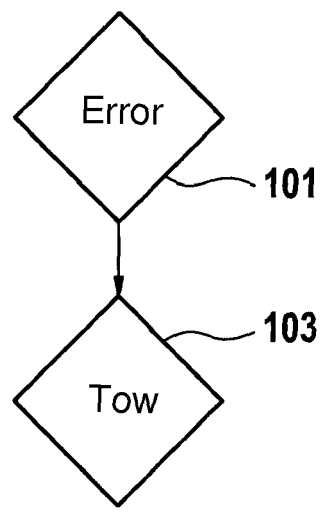
FIG. 1 shows a flow chart of a method for operation a towing robot.

FIG. 1 shows a flow chart of a method for operation of a towing robot.

According to a step 101, in the event an error occurs during autonomous driving of a vehicle within a parking lot (or on a parking lot), the error causing the vehicle to be immobilized, a towing robot is instructed to tow the immobilized vehicle to a predetermined position. This thus means that the towing robot receives a towing command in step 101.

In response to the instruction, i.e., in response to the towing command, the towing robot tows the immobilized vehicle to the predetermined position according to a step 103.

In a specific embodiment which is not shown, the towing robot is a parking robot. In another specific embodiment which is not shown, the error is detected with the aid of a monitoring system external to the vehicle. In another specific embodiment which is not shown, the towing robot is instructed to tow in response to an error message of the vehicle. This thus means that in this specific embodiment, the vehicle itself reports the error.

Figure 2:
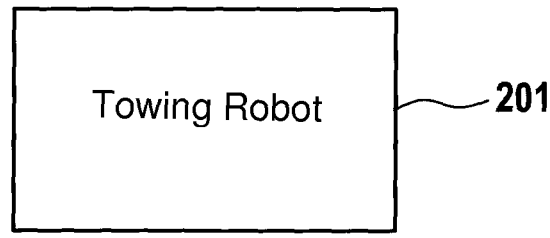
FIG. 2 shows a towing robot.

FIG. 2 shows a towing robot 201, which is configured for towing a vehicle which is immobilized within a parking lot to a predetermined position in response to an instruction. Towing robot 201 is, for example, a parking robot.

Figure 3:
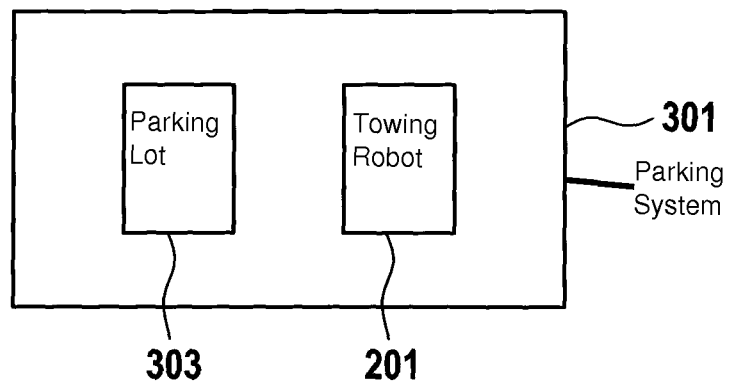
FIG. 3 shows a parking system.

FIG. 3 shows a parking system 301.

Parking system 301 includes a parking lot 303 as well as towing robot 201 of FIG. 2. Parking lot 303 includes multiple parking spaces or parking zones, which are not shown in detail here for the sake of clarity. In particular, parking lot 303 includes the predetermined position, so that towing robot 201 tows the immobilized vehicle to a position which is still situated within parking lot 303.

According to additional specific embodiments, which are not shown, one or multiple steps are provided in arbitrary combination:

1. The autonomous driving of the vehicle, in particular the automatic maneuvering of the vehicle into or out of a parking space, is tracked by a parking lot management system, for example, with the aid of video cameras.

2. If the parking lot management system notices an error, for example, because the vehicle does not continue to drive, and/or the vehicle reports an error to the parking lot management system, the towing robot, in particular the parking robot, is automatically instructed by the parking lot management system to clear the vehicle away.

3. The towing robot, preferably the parking lot robot, drives to the vehicle automatically and drives the vehicle to an error area, i.e., to a predetermined position.

4. For this operation, the parking lot management system blocks the area for the driving operation of the towing robot, in particular the parking robot, with and without a vehicle, preferably for other traffic, i.e., for other vehicles and/or persons.

According to one specific embodiment, it is provided that the area in which the parking lot robot, generally the towing robot, is located, is blocked for persons, at least during its driving time.

In another specific embodiment, it is provided that all activities, in particular the autonomous driving of the vehicle within the parking lot and/or the towing of the vehicle with the aid of the towing robot and/or the driving of the towing robot are documented by the parking lot management system, for example, by the preparation of video recordings.

A parking lot management system coordinates in particular an assignment of the parking spaces or parking zones, i.e., the parking positions, and/or hands over to the autonomous vehicles the information necessary (for example, a digital map of the parking lot, in particular of the parking garage). The parking lot management system may preferably include a data processing device, which carries out or supports the above-described tasks of the parking lot management system.

What is claimed is:

1. A method for operating a towing robot by a parking lot management system, comprising:
monitoring autonomous driving of a vehicle, by a data processing device of the parking lot management system, for errors with the aid of a monitoring system which is entirely external to the vehicle;
determining, by the data processing device based on the monitoring, that an error has occurred during autonomous driving of the vehicle within a parking lot, the error causing the vehicle to be no longer able to continue its autonomous driving; and
communicating an instruction to the towing robot, by the data processing device in response to the determining, to tow the vehicle to a predetermined position, so that the towing robot tows the vehicle to the predetermined position in response to the instruction.

2. The method as recited in claim 1, wherein the monitoring system includes at least one video camera entirely external to the vehicle.

3. The method as recited in claim 2, further comprising employing the at least one video camera to document at least one of:
autonomous driving of the vehicle within the parking lot, and
towing of the vehicle with the aid of the towing robot.

4. The method as recited in claim 1, further comprising blocking, at least during a towing time, an area for at least one of other vehicles and persons, the area corresponding to an area in which the towing robot moves in order to tow away the vehicle.

5. The method as recited in claim 1, wherein the towing robot is a parking robot.

6. A parking lot management system, comprising:
a data processing device configured to:
monitor autonomous driving of a vehicle for errors with the aid of a monitoring system which is entirely external to the vehicle;
determine that an error has occurred during autonomous driving of the vehicle within a parking lot, the error causing the vehicle to be no longer able to continue its autonomous driving; and
communicate an instruction to a towing robot, in response to determination of the error, to tow the vehicle to a predetermined position, so that the towing robot tows the vehicle to the predetermined position in response to the instruction.

7. A parking system, comprising:
a parking lot;
a towing robot for towing a vehicle present within the parking lot; and
a data processing device configured to:
monitor autonomous driving of a vehicle for errors with the aid of a monitoring system which is entirely external to the vehicle;
determine that an error has occurred during autonomous driving of the vehicle within the parking lot, the error causing the vehicle to be no longer able to continue its autonomous driving; and
communicate an instruction to the towing robot, in response to determination of the error, to tow the vehicle to a predetermined position, so that the towing robot tows the vehicle to the predetermined position in response to the instruction.

8. The parking system as recited in claim 7, wherein the monitoring system includes at least one video camera entirely external to the vehicle.

9. The parking system as recited in claim 8, further comprising:
a documentation device for employing the at least one video camera to document at least one of:
autonomous driving of the vehicle within the parking lot, and
towing of the vehicle with the aid of the towing robot.

10. A computer program product, including a non-transitory computer-readable medium storing program code for causing at least one data processing device to:
- perform monitoring of autonomous driving of a vehicle for errors with the aid of a monitoring system which is entirely external to the vehicle;
- perform determining, based on the monitoring, that an error has occurred during autonomous driving of a vehicle within a parking lot, the error causing the vehicle to be no longer able to continue its autonomous driving; and
- communicate an instruction to the towing robot to tow the vehicle to a predetermined position, so that the towing robot tows the vehicle to the predetermined position in response to the instruction.

* * * * *